US008805823B2

(12) United States Patent
Nitz

(10) Patent No.: US 8,805,823 B2
(45) Date of Patent: Aug. 12, 2014

(54) CONTENT PROCESSING SYSTEMS AND METHODS

(75) Inventor: Kenneth C. Nitz, Redwood City, CA (US)

(73) Assignee: SRI International, Menlo Park, CA (US)

( * ) Notice: Subject to any disclaimer, the term of this patent is extended or adjusted under 35 U.S.C. 154(b) by 568 days.

(21) Appl. No.: 12/760,439

(22) Filed: Apr. 14, 2010

(65) Prior Publication Data

US 2010/0262599 A1 Oct. 14, 2010

Related U.S. Application Data

(60) Provisional application No. 61/169,214, filed on Apr. 14, 2009.

(51) Int. Cl.
*G06F 17/30* (2006.01)
(52) U.S. Cl.
CPC .................. *G06F 17/3087* (2013.01)
USPC ........................................ 707/722; 707/723
(58) Field of Classification Search
CPC .......... G06F 17/3087; G06F 17/30864; G06F 17/30256; G06F 17/30274; G06F 17/30628; G06F 17/30011; G06F 17/30796; G06F 17/3071; G06F 17/30905; G06F 9/4443; G06F 9/45533; G06F 9/4881; G06F 11/2094

USPC ................................................... 707/722, 723
See application file for complete search history.

(56) References Cited

U.S. PATENT DOCUMENTS

| | | | | |
|---|---|---|---|---|
| 5,687,364 A * | 11/1997 | Saund et al. | ...................... | 704/5 |
| 6,029,192 A * | 2/2000 | Hill et al. | ...................... | 709/206 |
| 6,397,231 B1 | 5/2002 | Salisbury et al. | ............. | 715/234 |
| 6,523,026 B1 * | 2/2003 | Gillis | .................................. | 1/1 |
| 7,143,342 B1 * | 11/2006 | Baweja et al. | ................ | 715/207 |
| 7,299,500 B1 * | 11/2007 | Klebe et al. | ..................... | 726/26 |
| 2004/0143580 A1 * | 7/2004 | Chi et al. | ....................... | 707/100 |
| 2004/0249892 A1 * | 12/2004 | Barriga et al. | .................. | 709/206 |
| 2005/0108247 A1 * | 5/2005 | Heinla et al. | .................... | 707/10 |
| 2005/0144169 A1 * | 6/2005 | Humphrey et al. | .............. | 707/7 |
| 2006/0073851 A1 * | 4/2006 | Colando et al. | ............... | 455/566 |
| 2007/0078822 A1 * | 4/2007 | Cucerzan et al. | ................. | 707/3 |
| 2007/0214097 A1 * | 9/2007 | Parsons et al. | ................... | 706/12 |
| 2008/0005284 A1 * | 1/2008 | Ungar et al. | ..................... | 709/219 |
| 2008/0031280 A1 * | 2/2008 | Georgis et al. | ............... | 370/486 |
| 2008/0147597 A1 * | 6/2008 | Hamilton | ........................ | 707/2 |
| 2008/0214148 A1 * | 9/2008 | Ramer et al. | ............... | 455/414.1 |
| 2009/0193078 A1 * | 7/2009 | Gupta et al. | .................. | 709/204 |
| 2010/0082615 A1 * | 4/2010 | Clinchant et al. | ............. | 707/728 |

* cited by examiner

*Primary Examiner* — Apu Mofiz
*Assistant Examiner* — Fariborz Khoshnoodi
(74) *Attorney, Agent, or Firm* — Marger Johnson & McCollom PC

(57) ABSTRACT

A content processing system may include any of a number of content processing techniques such as condensed content management, multi-content compilation management, associated content compilation management, recommended content management, and content cluster management.

41 Claims, 11 Drawing Sheets

Figure 9

| | | | | | |
|---|---|---|---|---|---|
| Results | 1 - 30 of about 30 | | | | |
| Date | Title | Blog | Question | Categories | Score ▼ |
| ○ April 12, 2010 | Book Review: The New Golf | | | Sports; Book Review | 0.698 |
| ○ April 11, 2010 | News article re: The Masters | | | Sports | 0.552 |
| ○ April 12, 2010 | Famous golfer profiles | | | Sports; Biography | 0.349 |

900

902a, 902b, 902c — row identifiers
904a/b/c, 906a/b/c, 908a/b/c, 910a/b/c — action icons
912a/b/c — Score values
914a/b/c — Categories values

US 8,805,823 B2

CONTENT PROCESSING SYSTEMS AND METHODS

CROSS-REFERENCE TO RELATED APPLICATION

This application claims the benefit of U.S. Provisional Application No. 61/169,214, filed Apr. 14, 2009, which is hereby incorporated by reference in its entirety.

FEDERALLY SPONSORED RESEARCH OR DEVELOPMENT

This invention was made with government support under contract number FA8750-07-D-0185 awarded by the Air Force Research Laboratory. The government has certain rights in this invention.

TECHNICAL FIELD

The disclosed technology pertains to tools and techniques for processing various types of content such as news articles.

BACKGROUND

There is a great sea of change with respect to the processing of various types of content such as news articles and other kinds of information available to users on the Internet and elsewhere. Twenty-four-hour news articles, real-time content streams such as Twitter, ExecTweets, Facebook, and texting discussions, MySpace, CraigsList-type postings, emails, blogs, RSS feeds, and event pushes tend to be in constant use by millions of users around the world. The resulting information overload can be enormous and overwhelming to a user, particular those that are faced with demanding schedules and little time to read, let alone fully process the news and events that may be of particular interest to a user.

There remains a need for a way to address these and other problems associated with the prior art.

BRIEF DESCRIPTION OF THE DRAWINGS

FIG. 9 is a block diagram representing a sample screenshot of a user interface portion of a content recommendation module in accordance with embodiments of the disclosed technology.

DETAILED DESCRIPTION

Figure 1:
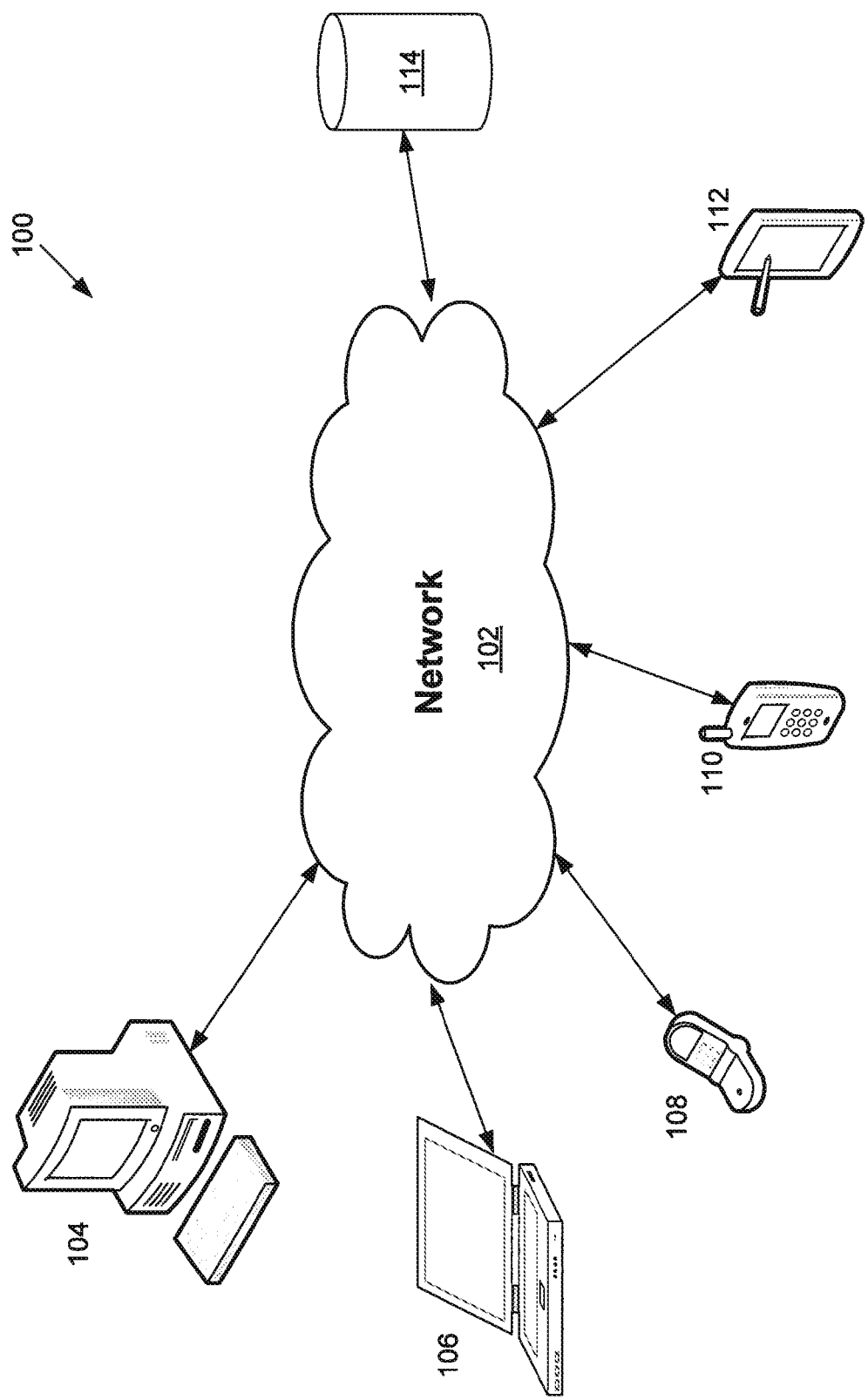
FIG. 1 is a block diagram that illustrates an example of a content processing system in accordance with embodiments of the disclosed technology.

In certain embodiments, a system may receive a content such as a news article or other document and analyze the content to create a condensed content. For example, the system may separate the received content into various portions such as words, phrases, or sentences. The system may identify certain strings in the content as having a higher importance or interest than the other portions of the content. The system may select these portions and remove all of the other portions of the content, thereby resulting in a condensed content that the system may store locally or remotely and also present to a user.

In certain embodiments, a system may receive a content and separate the content into sub-portions. For example, the system may parse the content at a sentence level or at a word level. The system may also retrieve location information corresponding to the content and, based on both the parsing and the location information, the system may conduct a search for secondary contents. The system may then organize the secondary contents into a multi-content compilation that may be stored and presented to a user. A user may access each multi-content compilation using the same device that stores the multi-content compilation or remotely by way of a separate device.

In certain embodiments, a system may receive a content that pertains to a particular event. The system may determine identification information corresponding to the content as well as at least one topic associated with the content. The identification information may include an identity of a person, place, or thing in connection with the content itself or with the event. The system may perform a search using the identification information and the topic as search parameters. A tag, comment, or timestamp may be added to the search results by a user, by the system, or both. The associated contents may be incorporated into an associated content compilation that may be stored by the system. Each associated content compilation may also be presented to a user in any of a number of different ways.

In certain embodiments, a system may receive an indication of a particular content. For example, a user may provide the indication by selecting the corresponding content by way of a user interface. The system may determine identification information for the content and monitor secondary content-providing sources, such as websites or blogs. The system may, pursuant to an update time limit, compare the secondary contents to the original content and select some of the secondary contents to be incorporated into a multi-content arrangement that may include the original content. The multi-content arrangement may be stored and presented to a user as a single content, a listing of some or all of the secondary contents, or a combination thereof. In certain embodiments, a user may edit a multi-content arrangement by adding or removing secondary contents, for example.

In certain embodiments, a system may present a number of different contents to a user along with a mechanism to allow the user to indicate whether he or she likes or dislikes each content. The user may also use an interface to remove a content from the presented contents or to request more information concerning a particular content. The system may also monitor contents that the user accesses and collect information pertaining to the monitoring. The system may use the positive and negative feedback received from the user along with the monitoring-related information to generate a listing of recommended contents where each recommended content may be of interest to the user. The user may provide the system with feedback concerning the listing that the system may use to refine the listing generation techniques for future listings of recommended contents.

In certain embodiments, a system may generate and maintain a number of distinct content clusters. Each content cluster may be defined by a number of content cluster words. In addition, each content cluster may have associations to a number of different contents that each have the corresponding content cluster words therein. A user may create new content clusters or they may be generated automatically by the system. Previously generated content clusters may be edited or deleted by either the system or a user.

Embodiments of the disclosed technology may emphasize the finding and understanding of various types of content, as well as the notification of such contents to users when appropriate. Such contents may be presented to an individual in a form that is designed for quick understanding. Embodiments of the disclosed technology may be used for processing various types of situations that involve communication between multiple persons, such as meetings, video and teleconference transcripts, and doctor and patient encounters, for example.

FIG. 1 is a block diagram that illustrates an example of a content processing system 100 in accordance with embodiments of the disclosed technology. As used herein, a content may include, but in not limited to, one or more text-based documents such as news articles, emails, updates, and blogs, tasks, and events such as calendar items.

In the example, the content processing system 100 includes a network 102 such as the Internet, an intranet, a home network, or any combination thereof. Personal computers 104 and 106 may connect to the network 102 to communicate with each other or with other devices connected to the network. The content processing system 100 also includes three mobile electronic devices 108-112. Two of the mobile electronic devices 108 and 110 are communications devices such as cellular telephones or smart phones such as an Apple iPhone®. A remote storage device 114 may store some of all of the data, including content, accessed and used by any of the computers 104 and 106 or mobile electronic devices 108-112.

Condensed Content Management

Many people lead very busy lives nowadays. The time required for a user to read an entire news article often exceeds the amount of time that the user desires to spend or is able to take. Furthermore, the small screen space of certain electronic devices such as personal digital assistants (PDAs), smart phones, and other portable electronic devices often makes for clumsy, inefficient, and often incomplete reading by the user, let alone comprehension. Embodiments of the disclosed technology may assist a user by identifying nuggets of information within a given article while removing extraneous material. By providing more than just a title or the first line of the article, the system may enable the user to read the article both quickly and for understanding.

Embodiments of the disclosed technology may break down a content, such as a news article or an event, into individual portions such as sentences, words, phrases, or any combination thereof. The system may examine these portions for heuristically derived and machine learned words and phrases having special meaning and then identify those portions as containing information that may be important to the understanding of the document. Examples of these words or phrases may include "goal will be" and "features a," for example.

In certain embodiments, there may be up to four different types of word or phrase discriminators: meaningful words, background words, cause-and-effect words, and request words. The system may identify these words as well as words preceding or following the identified words. For example, the system may identify the words immediately preceding or immediately following "goal will be" or "been associated with." If the additional words are pronouns, a semantic extraction module, such as those described below, may be implemented to perform pronoun rectification.

The system may generate a condensed content by extracting the portions of the content having these words or phrases, comparing the extracted portions to one another for any duplication and repetition, and discarding or removing any repetitive portions. The condensed content may be significantly shorter than the content in its original form. For example, the system can generate a condensed content having only ten sentences from a content, such as a news article or other document, that has over a hundred sentences. A condensed content may be considered an intelligent summary of the corresponding original content.

Figure 2:
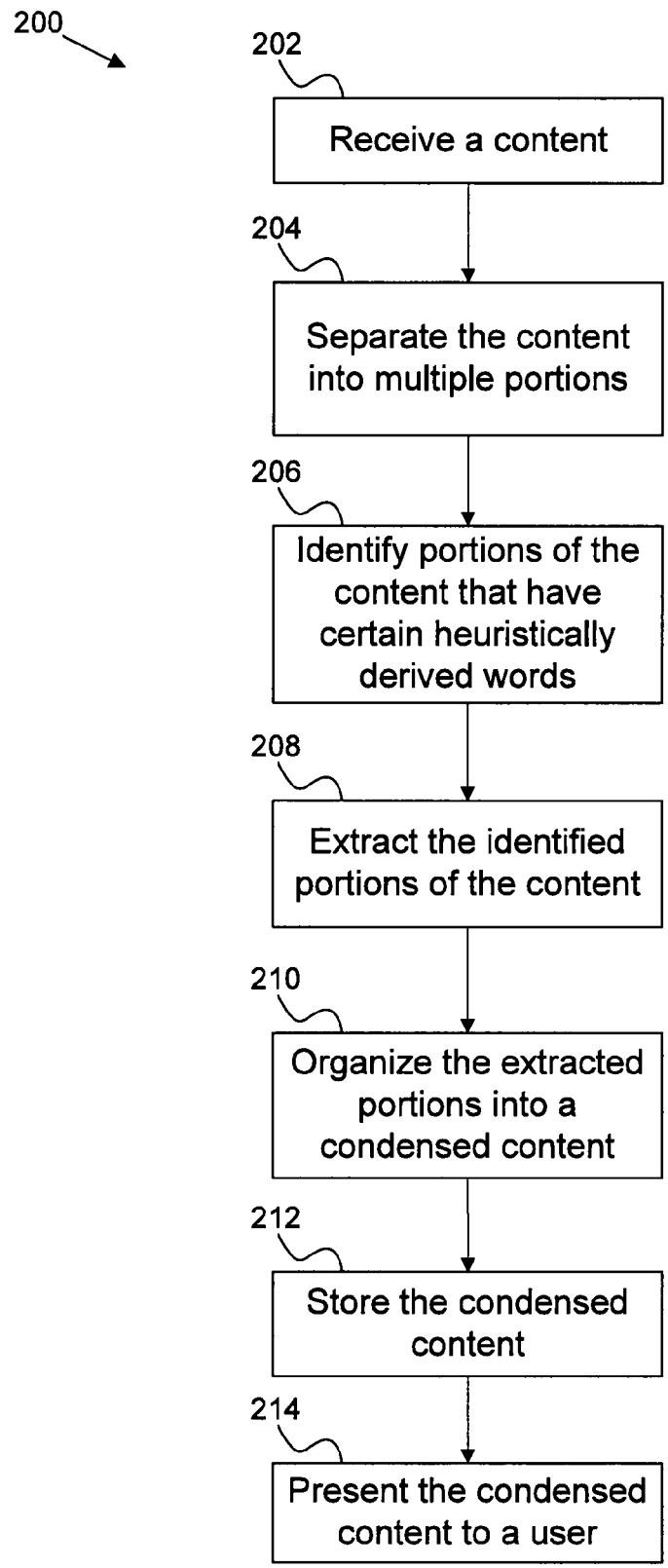
FIG. 2 is a flowchart that illustrates an example of a machine-controlled method of analyzing a content to generate a condensed content in accordance with embodiments of the disclosed technology.

FIG. 2 is a flowchart that illustrates an example of a machine-controlled method 200 of analyzing a content to generate a condensed content in accordance with embodiments of the disclosed technology. At 202, the system receives a content. For example, a user may select a particular content, such as a news article, email, blog entry, or other document of interest, by way of a user interface. Alternatively, the system may select the content using any of the techniques described herein. For example, the system may select the content based on a determination that the user may be interested in the content.

At 204, the system separates the content into multiple portions. For example, the system may parse the content at word level, phrase level, sentence level, or any combination thereof. The system may also separate the content based on an identification of certain strings or operators within the text.

Once the system has separated the content into multiple portions, the system may then identify certain heuristically derived words within the portions, as shown at 206. In certain embodiments, heuristically derived words generally include words, phrases, or other text strings that may convey certain meaningful aspects of the content. As discussed above, the words to be identified may include words or phrases classified as meaningful words, background words, cause-and-effect words, or request words.

At 208, the system extracts the identified portions of the content. For example, the system may extract each sentence having one of the identified words or phrases. The system may do so by extracting the entire sentence or only a portion thereof. In certain embodiments, the system may remove non-identified portions of the content deemed. For example, the system may remove, e.g., delete, all of the portions of the content other than the identified portions from 206. Alternatively, the system may remove only those words and phrases that are deemed common words, such as "a," "an," "the," and "and." The system may also search for and remove redundant language. For example, if the system identifies two portions that recite similar or identical information, the system may remove one of the redundant portions.

At 210, the system arranges the extracted portions of the content into a condensed content. For example, the condensed content may consist entirely of the portions of the content that were extracted at 208. The system may add or remove aspects of the content such as punctuation. For example, in situations where the system extracts only a portion of a sentence, the system may add a period to the end of the extracted portion within the condensed content.

Once the condensed content has been created, the system may store the condensed content, as shown at 212. The condensed content may be stored locally, e.g., by the user's personal computer or mobile device, or at a remote storage device, such as a third-party database. The condensed content may also be presented to a user, as shown at 214. In certain embodiments, the device storing the condensed content may be the device to also present the condensed content to the user. Alternatively or in addition, a separate device may be used to present the condensed content to the user. For example, a remote storage device may store the condensed content and the user may access the condensed content using his or her mobile device while travelling and then again using his or her desktop computer at home upon return.

In certain embodiments, the system may generate a condensed content but not present it to the user until the user requests it. For example, a user may wish to read all of his or her condensed contents after getting home from work and not be bothered by receiving the condensed contents until a previously specified time or upon the user's request.

When presenting a condensed content to a user, the system may associate the condensed content to the corresponding original content. For example, the system may provide a link to the original content within the condensed content or provide the link with, but separate from, the condensed content. Alternatively, the system may provide the entire text of the original content within or separately but with the condensed content. For example, the user may desire to read the entire original content after reading the corresponding condensed content. Once the user has accessed or read the condensed content, he or she may transmit the condensed content to a destination, e.g., a website or blog, or to another user by way of any of a number of different types of communication such as email and tweeting, for example.

In certain embodiments, a user profile may be used to store user preferences and settings. The system may use the user profile to determine when to deliver the condensed content to the user. The system may also rely on the user profile to determine where to store the condensed contents. The user may access and edit his or her user profile by way of a user interface, for example.

Figure 3:
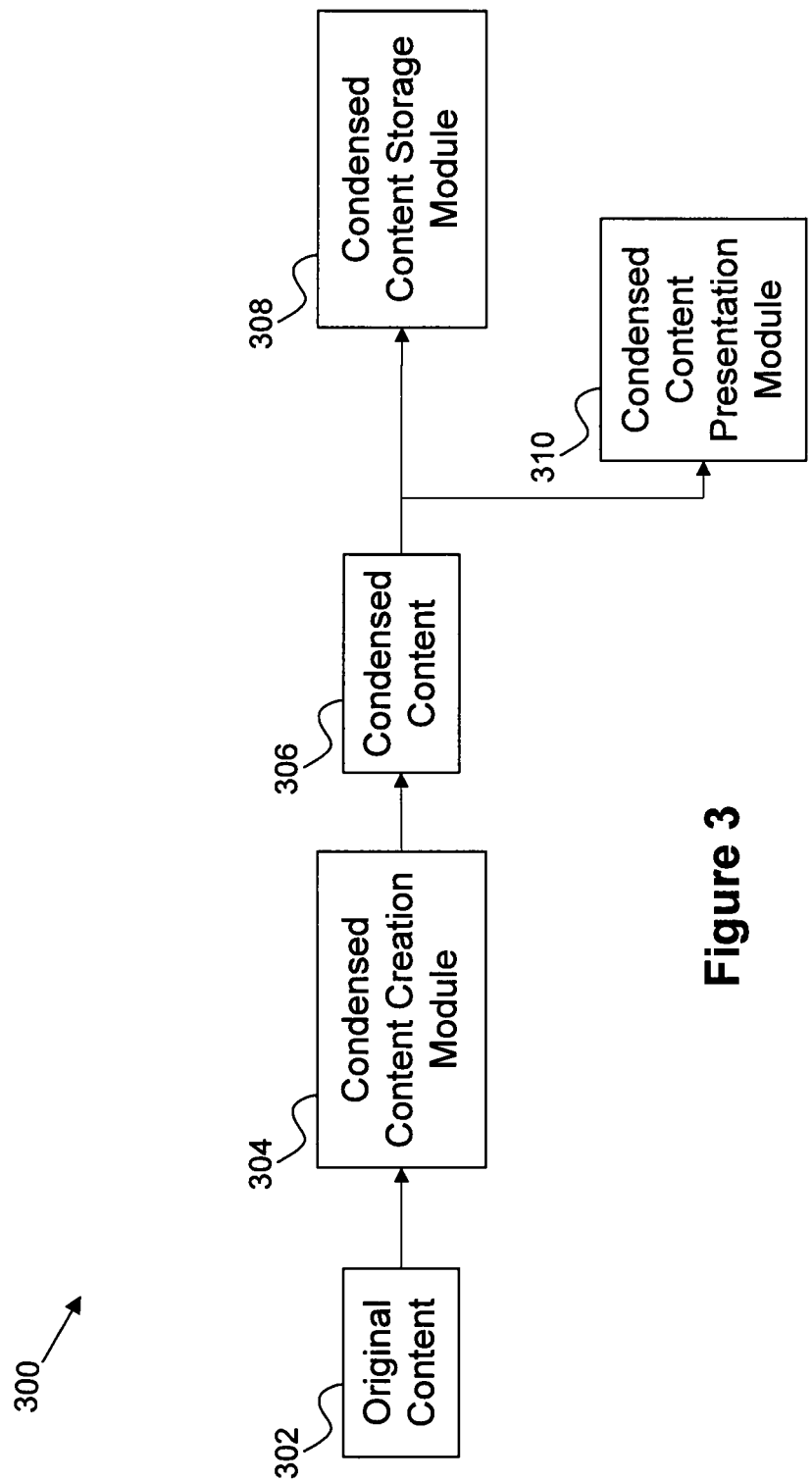
FIG. 3 is a block diagram that illustrates an example of a condensed content creation system in accordance with embodiments of the disclosed technology.

FIG. 3 is a block diagram that illustrates an example of a condensed content creation system 300 in accordance with embodiments of the disclosed technology. In the example, a content 302 is identified by a user or by the system 300. A condensed content creation module 304 receives the content 302 and processes the content 302 in accordance with the techniques described herein. The condensed content creation module 304 generates a condensed content 306 that corresponds to the original content 302 and can be stored by a condensed content storage module 308. The system 300 can also present the condensed content 306 to a user by way of a condensed content presentation module 310, such as a user interface on an electronic device, e.g., a smart phone.

An example of an implementation of the condensed content techniques described herein is as follows. Consider the following news article:

A team of scientists led by researchers from Princeton University has discovered a new way that electrons behave in materials. The discovery could lead to new kinds of electronic devices.

Writing in the Friday, July 25, issue of the journal Science, a team led by N. Phuan Ong, a professor of physics at Princeton, has shown that electrons in the common element bismuth display a highly unusual pattern of behavior—a dance, of sorts—when subjected to a powerful magnetic field at ultra-low temperatures.

Normally, electrons in bismuth come in three different varieties. But in the experiment described by the researchers, the electrons in the magnetized, supercold sample simultaneously assumed the identity of all three classes of electrons, following a strict choreography that could only stem, they say, from the strange rules of quantum physics. Quantum mechanics is the area of physics that governs the behavior of objects in the microscopic world. The experiment documented the first "phase transition"—a term used to describe an abrupt change in the behavior of a material—ever observed in a Group V element, one of the categories in chemistry's periodic table.

"If you can imagine, it's as if we were looking at passengers scrambling through Grand Central Station in New York, watching them run in different directions. All of a sudden, the whistle blows and we see them run to the same train. This is a simple example of a sudden transition to collective behavior," Ong said.

By witnessing what physicists call a "collective state," the team saw what Ong described as one of the wonders of nature. "It's a manifestation of quantum mechanics," he said.

It had been known that, in the complicated environment of a crystalline solid like bismuth, its electrons move more rapidly than they do in conventional materials. Although the maximum speed of electrons in bismuth is small compared with photons moving at the speed of light, the electrons mimic accurately the behavior of elementary particles accelerated to very high speeds. In bismuth, this "relativistic" property makes them likely candidates for the quantum behavior the scientists observed.

"This is exciting because this was predicted, but never shown before, and it may eventually lead to new paradigms in computing and electronics," said Thomas Rieker, program director for materials research centers at the National Science Foundation.

If scientists are able to document the behavior of the electrons in bismuth and therefore predict their path through a material, they may be able to manipulate those properties for electronic systems powering futuristic "quantum" computing devices.

"In the quest to develop ever smaller and faster transistors, physicists and engineers are attempting to harness the quantum behavior of electrons," Ong said. "Research in bismuth and another material, graphene, may uncover further new results that will expand the toolkit of quantum researchers."

Electrons are the lightest elementary particles with an electric charge. In the past, understanding the rules governing the way electrons move through materials has allowed scientists to make major advances, from the development of medical imaging to the invention of the transistor. "The modern era of computing and telecommunications rests on advances in solid state physics," Ong said. "We can't yet know what we will learn from this but the past tells us that understanding the behavior of electrons points us in important new directions."

The experiment also involved Robert Cava, the Russell Wellman Moore Professor of Chemistry and department chair, as well as physics graduate students Lu Li and Joseph Checkelsky and postdoctoral fellow Yew San Hor. Scientists from the University of Michigan and the University of Florida also participated.

To obtain the results, the scientists balanced a crystal of high-purity bismuth at the tip of a tiny gold cantilever and measured the minute flexing of the cantilever as the magnetic field changed. They performed the experiment using the most powerful magnet in the world at the National High Magnetic Field Laboratory in Tallahassee, Fla. The 34-ton magnet produces a magnetic field measuring 45 Teslas—1 million times more powerful than the Earth's magnetic field. The facility is funded by the National Science Foundation, the U.S. Department of Energy and the state of Florida.

In the example, the system receives this content and first separates the article into sentences. The system then identifies certain heuristically derived words such as "discovery," "experiment," "new," and "uncover," for example, within the sentences. The system extracts the sentences having these identified words and organizes the extracted sentences into the following condensed content:

A team of scientists led by researchers from Princeton University has discovered a new way that electrons behave in materials.>

The discovery could lead to new kinds of electronic devices.>

The experiment documented the first "phase transition"—a term used to describe an abrupt change in the behavior of a material—ever observed in a Group V element, one of the categories in chemistry's periodic table.>

By witnessing what physicists call a "collective state," the team saw what Ong described as one of the wonders of nature.>

In bismuth, this "relativistic" property makes them likely candidates for the quantum behavior the scientists observed.>

This is exciting because this was predicted, but never shown before, and it may eventually lead to new paradigms in computing and electronics," said Thomas Rieker, program director for materials research centers at the National Science Foundation.>

Research in bismuth and another material, graphene, may uncover further new results that will expand the toolkit of quantum researchers.">

We can't yet know what we will learn from this but the past tells us that understanding the behavior of electrons points us in important new directions.">

The 34-ton magnet produces a magnetic field measuring 45 Teslas—1 million times more powerful than the Earth's magnetic field.>

As discussed above, there are a number of ways of presenting this condensed content to a user. For example, the system may send this condensed content to the user's portable electronic device. The system may also store this condensed content for later viewing or subsequent viewings by the user or another user.

Multi-Content Compilation Management

When reading a certain content, users often enjoy receiving with the content more information that adds supporting information for clarification and better understanding. Certain implementations of the disclosed technology may be referred to as an automatic news generator because they may 'read' a content, such as a news article, and find where more clarity is needed or where there is updated information on the subject. For example, the system may add another new or related article or bit of information or automatically expand a news headline by looking up the history, information about location, conditions concerning the event, and what the action in the headline means in light of this information. The system may present the collected information to the user in an orderly fashion such that the user may quickly and efficiently absorb the additional related information. In certain embodiments, the user may 'train' the system as to the correctness of its actions and approach.

Figure 4:
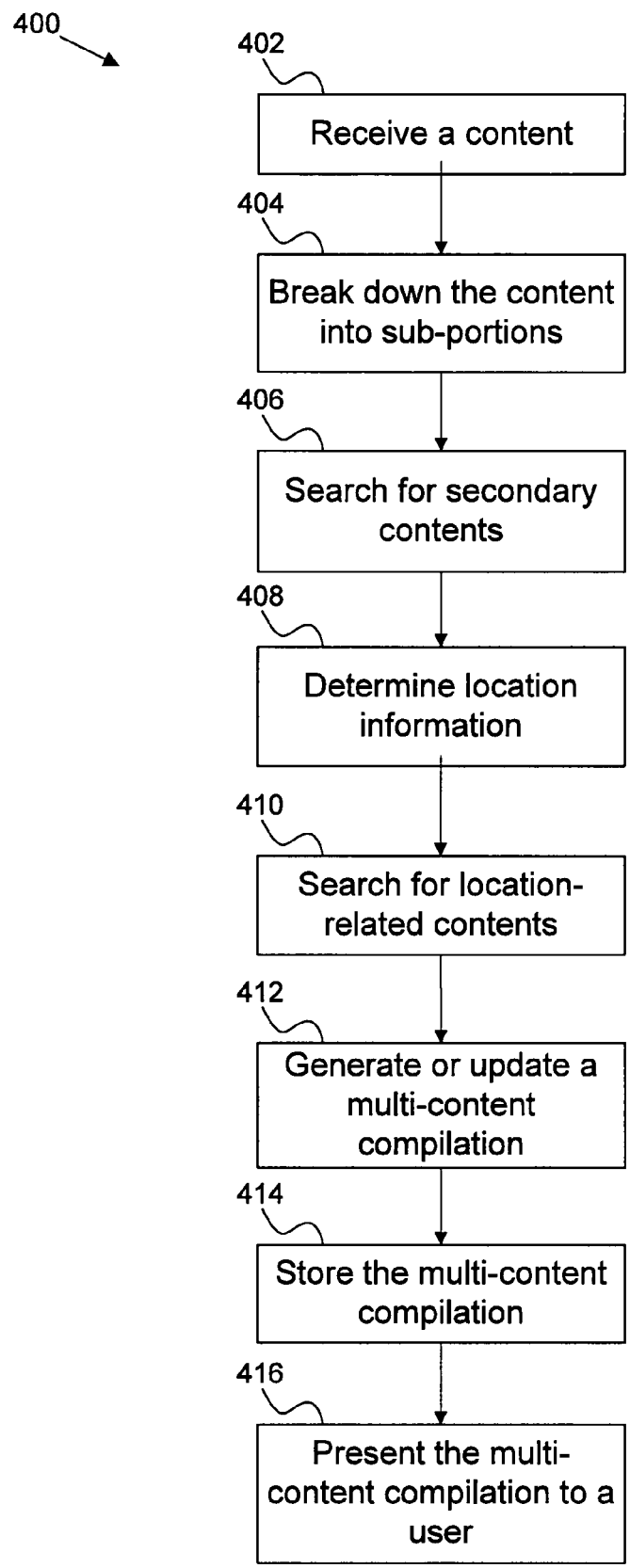
FIG. 4 is a flowchart that illustrates an example of a machine-controlled method of generating a multi-content compilation in accordance with embodiments of the disclosed technology.

FIG. 4 is a flowchart that illustrates an example of a machine-controlled method 400 of generating a multi-content compilation in accordance with embodiments of the disclosed technology. At 402, the system receives a content. For example, a user may select the content by way of a user interface. Alternatively, the system may identify the content based on a determination that the user may be interested in the content, e.g., the content is related to another content that the user previously indicated as being of interest to him or her.

At 404, the system breaks down the content into sub-portions. For example, the system may separate the content by sentence, by word, by text string, or by any combination thereof. The system may identify certain words or phrases within the sub-portions and use the identified words, e.g., verbs, or phrases to search for one or more secondary contents, as shown at 406. In certain embodiments, the system may identify and extract information such as topics, people, and locations, and use this information as part of a search for secondary contents. These secondary contents may include, but are not limited to, contents that may be of the same format as the original content or have a different format, and that may provide information pertaining to a subject of the original content.

Certain implementations of the disclosed technology may include the application of semantic extraction techniques to determine one or more verbs used in the title and/or first line of the content. The system may also determine whether an action is different than an action corresponding to previously obtained articles. Consider an example in which a previous search was based on Ted being engaged to Anne. If a new content indicates that Ted and Anne are now married, the system may conduct a new search with respect to Ted and Anne and compare the results to the previously obtained contents. If the articles are substantially similar or identical, the system may use the previously collected contents. Otherwise, the system may choose to remove the previous contents and replace them with the new contents.

At 408, the system determines location information. In certain embodiments, the location information may identify the geographic location of one or more of a user, a computing device, a subject or topic of the original content, a device storing the original content, and a device storing one of more of the secondary contents. For example, the system may request a user's location by way of a user interface. Alternatively, a global positioning system (GPS) of the system may automatically determine the user's location or that of the user's computing device.

At 410, the system searches for location-related content. For example, if the user is currently in Hawaii, the system may search for contents pertaining to Hawaii. In embodiments involving location information corresponding to a subject of the content, the location-related content will typically pertain to the subject of the content. For example, if the original content is an article about Germany, the system may search for contents pertaining to Germany regardless of whether the user is presently in Germany.

In situations where a multi-content compilation has already been created, the system may perform a check to see if any of the location information has changed and, if not, the system may use the previously obtained location-related contents. They system may also perform a search to update or replace the previously obtained content.

At 412, the system generates a new multi-content compilation or updates a previously created multi-content compilation. As used herein, a multi-content compilation generally refers to a collection of some or all of the searched-for contents, links thereto, or a combination thereof. For example, a multi-content compilation may include a single document containing the original content plus some or all of the contents as retrieved in their entirety. Alternatively, the multi-content compilation may include a listing of links, e.g., hyperlinks, to some or all of the secondary and location-based contents.

In certain embodiments, some of the information may be positioned within a background section of the multi-content compilation. In situations where the system obtains location-based information, for example, the system may place the location-based information within a background section of the multi-content compilation. Such positioning may serve to effectively provide an indication to the user that, while the information may not be directly related to the original content, the information may be at least indirectly related to the original content, e.g., by way of a common locality aspect.

In certain embodiments, the multi-content compilation may include a summary of some or all of the secondary and location-based contents rather than the contents in their entirety. To the extent that the multi-content compilation includes links to the secondary or location-based contents, the multi-content compilation may include a brief description or summary of the content to which the link refers. Any or all of these summaries may be obtained using the condensed content techniques described herein, for example.

Once a multi-content compilation has been created, the system may store the multi-content compilation, e.g., locally or remotely, as shown at 414. In situations where the system is updating a previously created multi-content compilation, the system may access the multi-content compilation stored by the corresponding storage device to do so. For stored multi-content compilations having links to the secondary contents or location-based contents, the system may update such contents if the system has access to the device storing the pertinent contents. Otherwise, the system may insert into the multi-content compilation a flag, note, or comment that the information within the pertinent content may no longer be current or correct.

The system may present multi-content compilations to a user, as shown at 416. A multi-content compilation stored on a user's computing device may be readily accessible to the user. In situations where a multi-content compilation is stored by a remote storage device, e.g., the user's home computer or a third-party server, the user may be able to access the multi-content compilation by way of a number of different devices, e.g., a smart phone. Such arrangements may also minimize the amount of memory that the user's device would need for storing to the multi-content compilation locally and minimize any potential loss of performance by the device as a result of the user accessing the multi-content compilation.

Figure 5:
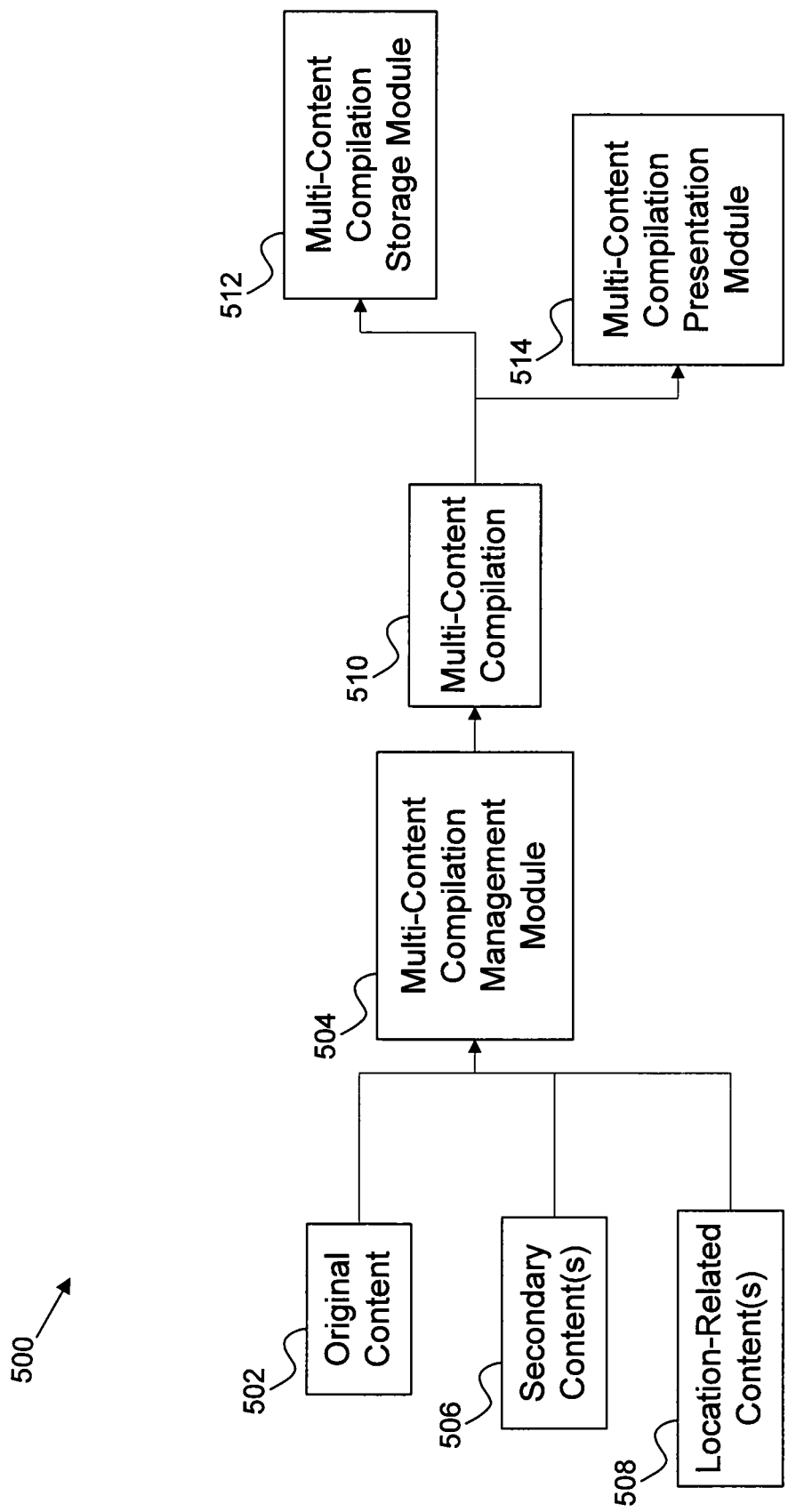
FIG. 5 is a block diagram that illustrates an example of a multi-content compilation management system in accordance with embodiments of the disclosed technology.

In certain embodiments, the system or a user may transmit or cause to be transmitted the multi-content compilation to a destination, e.g., a website or blog, or to another user by way of any of a number of different types of communication such as email and tweeting, for example FIG. 5 is a block diagram that illustrates an example of a multi-content management system 500 in accordance with embodiments of the disclosed technology. In the example, a content 502 is identified by a user or by the system 500. A multi-content management module 504 receives the content 502 and processes the content 502 in accordance with the techniques described herein. For example, the system 500 may search for and, in certain embodiments, retrieve one or more secondary contents 506 based on words or phrases identified within the content 502. The system 500 may also search for and, in some embodiments, retrieve location-related contents 508 based on location information describing a geographic location of the user, the system, etc.

The multi-content management module 504 may generate or update a multi-content compilation 510 that corresponds to the original content 502 and may be stored by a multi-content storage module 512. In certain embodiments, the multi-content storage module 512 may include a local database. Alternatively, the multi-content storage module 512 may include s remote storage device. The system 500 may also present the multi-content compilation 510 to a user by way of a multi-content compilation presentation module 514, such as a user interface of an electronic device. As discussed above, a user may access a multi-content compilation by way of any of a number of different personal electronic devices, such as a personal computer or a mobile electronic device, e.g., a smart phone.

Associated Content Compilation Management

In certain embodiments, the system may organize contents, such as news articles or other documents, within an associated content compilation. The associated content compilation may sort the contents in a descending timeline and separated by time values. The system may also remove duplicate entries from the compilation and apply condensed content techniques to the individual contents. In certain embodiments, such as the application of these techniques to news articles, these arrangements may be considered as news with analysis. Associated content compilations may enable a user to see how a particular story changes over time, for example, as well as how it began by creating an up-to-date storyline of the base event.

Figure 6:
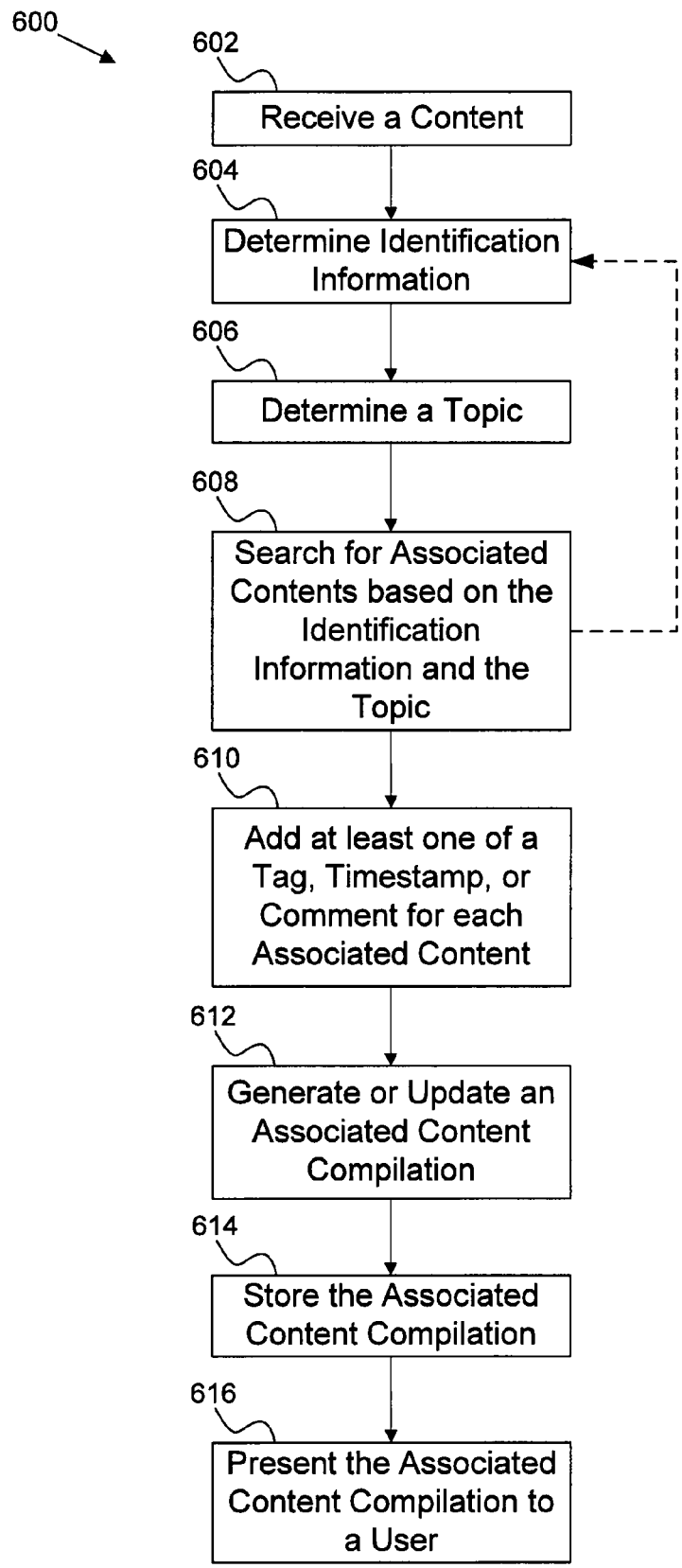
FIG. 6 is a flowchart that illustrates an example of a machine-controlled method of managing an associated content compilation in accordance with embodiments of the disclosed technology.

FIG. 6 is a flowchart that illustrates an example of a machine-controlled method 600 of managing an associated content compilation in accordance with embodiments of the disclosed technology. At 602, the system receives a content pertaining to an event. The content may include, but is not limited to, a news article, document, blog, wiki page, or any other item pertaining to an event that is of interest to the user. The user may select the content using a user interface. In alternate embodiments, the system may identify the content based on a determination that the user may be interested in the content.

Once the system has received the content, the system determines identification information corresponding to the content, as shown at 604. For example, the system may identify a person, organization, or geographic location that is mentioned or discussed within the content and is also involved with the event. The system also determines at least one topic associated with the content, as shown at 606. As used herein, a topic generally refers to a particular subject, focus, or theme of the content. The system may search for one or more associated contents, e.g., articles, documents, or wiki pages, based on the identification information and the topic, as shown at 608.

In certain embodiments, the system may add of the search results to the pertinent associated content compilation. Alternatively, the system may select less than all of the search results. For example, the system may add a relevance value to each associated content based on any of a number of factors and select only those associated contents that have a relevance value greater than a predetermined threshold amount. The threshold may be initially set or later modified by either a user or the system. By setting a high relevance threshold, the system may provide the user with articles or documents that are likely to be of interest to the user based on the original content.

Consider an example in which a user selects an article concerning a particular golf tournament in which a famous golfer is competing. In the example, the topic identified by the system may be "golf," and the identification information determined by the system may include the name of the golf tournament, the city and state in which the tournament is held, the name of the famous golfer, and the name of the golfer's sponsor. The system may then search for associated contents, such as other news articles, using the topic and identification information as the primary search words.

In certain embodiments, the system may perform steps 604-608 on one or more of the associated contents to provide another level of information for the user. For example, the system may select the associated contents having the highest relevance values and conduct a similar search to provide even more associated contents to be incorporated into the corresponding associated content compilation. Alternatively, the system may select all initial associated contents having a relevance value above the threshold and perform steps 604-608 on each of them. The user may also assist in determining which initial associated contents should be subject to an additional search by the system.

At 610, the system may add at least one of a tag, timestamp, and comment to each of the associated contents identified as a result of the searching at 608. In certain embodiments, the system may automatically add this information, such as a timestamp identifying the creation of the associated content, the publication of the associated content, or when the associated content was identified by the system. Alternatively or in addition, a user may add this information, such as a tag or comment in which he or she adds some information concerning the associated content. For example, the user may indicate that the article is "boring" or make a note that the associated content references another associated content.

At 612, the system generates a new associated content compilation or updates a previously created associated content compilation. As used herein, an associated content compilation generally refers to a collection of some or all of the searched-for contents, links thereto, or a combination thereof. For example, an associated content compilation may include a single content containing the original content plus some or all of the associated contents from the search results. Alternatively, the associated content compilation may include a listing of links, e.g., hyperlinks, to some or all of the associated contents.

In certain embodiments, the associated content compilation may include a summary of the associated contents using any the condensed content techniques described herein, for example. These summaries may be in addition to or in place of the actual text of the associated contents. Alternatively or in addition, multi-content compilations may be created or updated for any or all of the associated contents using the techniques described herein. A user may specify the number of 'levels' the system should expand in connection with an associated content compilation. For example, the user may indicate a more minimal amount of information, e.g., condensed contents, or a more extensive amount of information, e.g., multi-content compilations for corresponding associated contents.

In certain embodiments, the system may perform any of a number of different analyses on the associated content compilation. For example, the system may do more than simply identify information concerning a given event—the system may also determine how previous information is associated with the event and modify the current event accordingly. In certain embodiments, the system may compare and contrast the original content or associated contents to wikis, other events or news, plans, and previous events or articles. The system may also derive analysis using rules and heuristics with respect to how different groups or points of view may analyze certain situations.

Consider an example in which a user identifies an article stating that Bill Gates donates $100 million. The system may find an associated content providing that Bill Gates has a wealth of $56 billion. In the example, the system may calculate that Bill Gates donates 0.17857% of his wealth and, because the average person in the United States has a net worth of $100,000 (as determined by another associated content), the system may indicate that the average person may give or desire to give $178.57.

Once an associated content compilation has been created, the system may store the associated content compilation, locally or remotely, as shown at 614. In situations where the system is updating a previously created associated content compilation, the system may access the associated content compilation that is presently stored by the corresponding storage device to do so. For stored associated content compilations having links to the associated contents, the system may update the associated contents if the system has access to the device storing the pertinent contents.

The system may present associated content compilations to a user, as shown at 616. The associated content compilation may be presented in a descending chronological order such that the most recent associated content, e.g., the associated content having the most recent timestamp, is presented first, e.g., at the top of the listing. The associated content compilation may also be presented such that the viewer only sees a subset of the associated contents, e.g., the most recent or most relevant, without scrolling down or providing an indication for the system to present the other associated contents. In certain embodiments, the associated content compilation may be presented as a wiki page.

An associated content compilation stored on a computing device may be readily accessible to a user. In situations where an associated content compilation is stored by a remote storage device such as a home computer or a third-party server, a user may access the multi-content compilation by way of a number of different devices, such as a PDA or smart phone. These arrangements may minimize the amount of memory that the device would need for storing to the associated content compilation locally and minimize potential loss of performance by the device as a result of the user accessing the associated content compilation.

In certain embodiments, the system or a user may transmit or cause to be transmitted the associated content compilation to a destination, e.g., a website or blog, or to another user by way of any of a number of different types of communication such as email and tweeting, for example Multi-Content Arrangements Certain implementations of the disclosed technology may allow a user to keep track of or 'follow' a particular topic or article of interest. For example, in situations where a user sees an article that he or she wishes to follow in the future, the system may extract pertinent information from the article, such as people, places, and events described in or related to the article, and when future articles, events, etc. may happen. The system may compare the results with what the user wishes to follow and present these results to the user as a possible item of interest for the user. The disclosed technology may manage associated content arrangements that effectively provide a user with what the user wants, e.g., new or newly-discovered information and changes to previous information that have occurred in the followed event.

Figure 7:
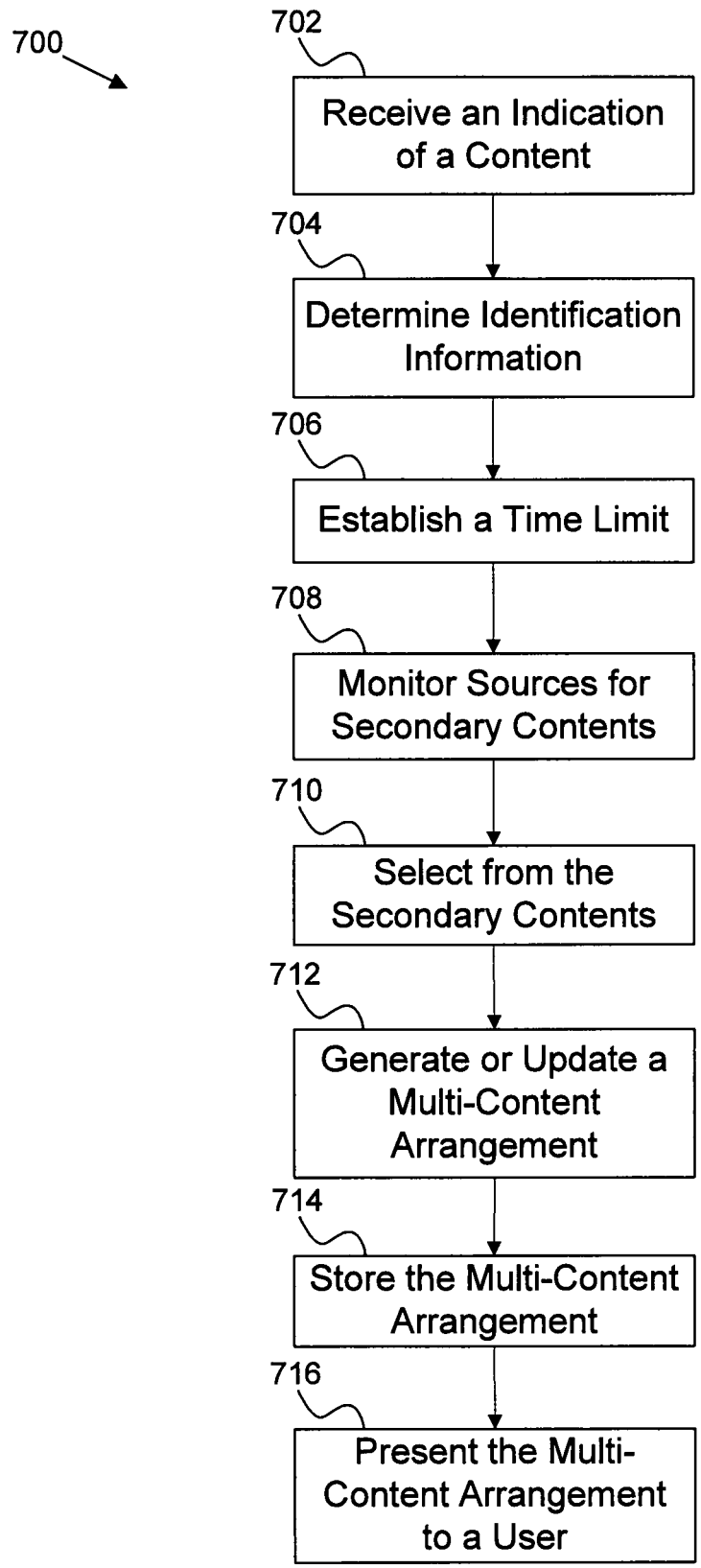
FIG. 7 is a flowchart that illustrates an example of a machine-controlled method of managing multiple content arrangements in accordance with embodiments of the disclosed technology.

FIG. 7 is a flowchart that illustrates an example of a machine-controlled method 700 of managing multiple content arrangements in accordance with embodiments of the disclosed technology. At 702, the system receives an indication of a particular content. For example, a user may select a particular content presented within a user interface. Alternatively, the system may select the content based on information such as a user profile indicating the user's interests. The indication of the content may include, but is not limited to, an article, a topic, a geographic location, an identification of a person or group, and an identification of an event.

At 704, the system determines identification information pertaining to the content such as identifiers, e.g., names, for an event, a person, a group, a geographic location, and a relationship between two or more entities. At 706, the system establishes an update time limit. The update time limit may include a default timeframe, e.g., one week, one month, or one year, or may be specified by a user. The system may also determine the update time limit based on previous user experiences. For example, if the user has consistently selected one year as the update time limit for previous multi-content arrangements, then the system may select one year for all new processing unless a counter-indication is received.

At 708, the system monitors secondary content-providing sources such as websites, news sources, blogs, RSS feeds, etc. The system may monitor these sources using the identification information determined at 704 as search parameters. For example, the system may extract Named Entities (NEs) as well as relationships between some or all of the NEs and any associated actions or events and search for secondary or associated contents based on the extracted information.

The monitoring may be continuous, at discrete intervals, or pursuant to external information such as user direction. The system may also halt the monitoring in accordance with the update time limit. Once the update time limit has been reached, for example, the system may query the user for confirmation that the monitoring should cease. Alternatively, the system may cease the monitoring without alerting the user.

The system may select from the secondary contents that result from the monitoring, as shown at 710, by comparing each secondary content to the original content. For example, the system may determine a relevance value for each secondary content and, if the relevance value exceeds a threshold amount, the system may incorporate the secondary content into the corresponding multi-content arrangement. In certain embodiments, the system may effectively ignore or remove secondary contents that the system determines to be substantially similar to the original content and, therefore, likely to be redundant. Also, the selecting at 710 may be subject to the same update time limit discussed above or an additional time limit.

Alternatively or in addition, the selecting at 710 may be based on a detected change in a previously identified relationship. Consider an example in which the system has previously identified a relationship between two NEs, e.g., individual people as being an engagement. If a secondary content indicates a relationship of 'married' between the same two NEs, then the system may select the corresponding content as being of possible interest to the user based on the detected change in relationship.

At 712, the system generates a new multi-content arrangement or updates a previously created multi-content arrangement. As used herein, a multi-content arrangement generally refers to a collection of some or all of the secondary contents resulting from the monitoring at 708, links thereto, or a combination thereof. For example, a multi-content arrangement may include a single content containing the original content plus some or all of the secondary contents. Alternatively, the multi-content arrangement may include a listing of links, e.g., hyperlinks, to some or all of the secondary contents.

In certain embodiments, the multi-content arrangement may include a summary of the secondary contents using any the condensed content techniques described herein, for example. These summaries may be in addition to or in place of the actual text of the secondary contents. Alternatively or in addition, multi-content arrangements may be created or updated for any or all of the secondary contents using the techniques described herein. For example, the user may indicate that he or she desires a more minimal amount of information, e.g., condensed contents, or a more extensive amount of information, e.g., associated content compilations for corresponding secondary contents.

In certain embodiments, the system may issue a notification to a user whenever a multi-content arrangement is created or updated. In situations where a new secondary content is monitored and selected, for example, the system may provide a notification to the user indicating that the secondary content has been selected to be incorporated into a new or existing multi-content arrangement. The system may send an indication of the secondary content or the secondary content itself. Alternatively, the system may send the new multi-content arrangement or re-send an existing multi-content arrangement with the secondary content incorporated therein. In certain embodiments, the system may request acknowledgement or confirmation from the user before performing the incorporation.

Once a new multi-content arrangement has been created, the system may store the newly-created multi-content arrangement, as shown at 714. This may be done locally or at a remote storage location. In situations where the system is updating a previously created multi-content arrangement, the system may directly access the multi-content arrangement that is stored by the corresponding storage device to perform the update, as shown at 714.

In certain embodiments, the system or a user may transmit or cause to be transmitted the multi-content arrangement to a destination, e.g., a website or blog, or to another user by way of any of a number of different types of communication such as email and tweeting, for example The system may present a multi-content arrangement to a user, as shown at 716. The multi-content arrangement may be presented in any of a number of different ways. For example, the secondary contents may be identified in a descending chronological order or based on relevance values. In certain embodiments, the user may specify whether he or she wishes to sort the secondary contents on the basis of timestamp, perceived relevance, or some other factor that may be of specific concern to the user, for example. The system may effectively enable the user to track, e.g., keep current with the particular content as indicated at 702.

Recommended Content Management

Certain implementations of the disclosed technology may include a recommended content management system to recommend contents, e.g., websites, blog postings, RSS feeds, tweets, real-time streams, media such as television shows and movies, news articles, or other documents or events, based upon what a user accesses, reads, views, likes, and dislikes. The system may also take into account recommendations of other users.

In certain embodiments, the system may allow a user to vote on a variety of events by providing positive and negative indicators from which a user may select for each content. The system may also add words and monitor contents accessed, e.g., read by the user. Certain implementations of the system may bring in new associated words that may lead to new content discovery, which would expand the amount of content the system may present to a user for voting purposes. The system may effectively provide the user with a listing of contents that may be of particular interest to the user.

In certain embodiments, the system may apply a learned model of the user's interests to a list of items to identify which of the items are most likely to be of interest and relevance to the user. The system may learn from a user what events the user likes and doesn't like and, based on this information, recommend new contents. The system may also monitor the behavior of the user in addition to accepting from the user and analyzing direct positive and negative input of a particular event. The disclosed technology may allow a user to enable a capability to either view or incorporate the recommendations of others that are most like them, enlarging the scope of the recommended contents generated for the user.

In certain embodiments, the system may be language independent. The system may work with a large number of different languages such as Spanish, French, Russian, Arabic, and Urdu. The system may identify and extract a number of words from a particular content. For example, the system may remove common words or "stopwords" from the content and associate the remaining words with an interest factor, e.g., positive value, or a disinterest factor, e.g., negative value. The system may use the extracted words and their associated word score, e.g., a cumulative count of positive values and negative values for the corresponding word, to form a user profile to be stored for the corresponding user. The system may also process word variants, e.g., "selling" and "sold" as well as synonyms, e.g., "fetched" and "retrieved."

Figure 8:
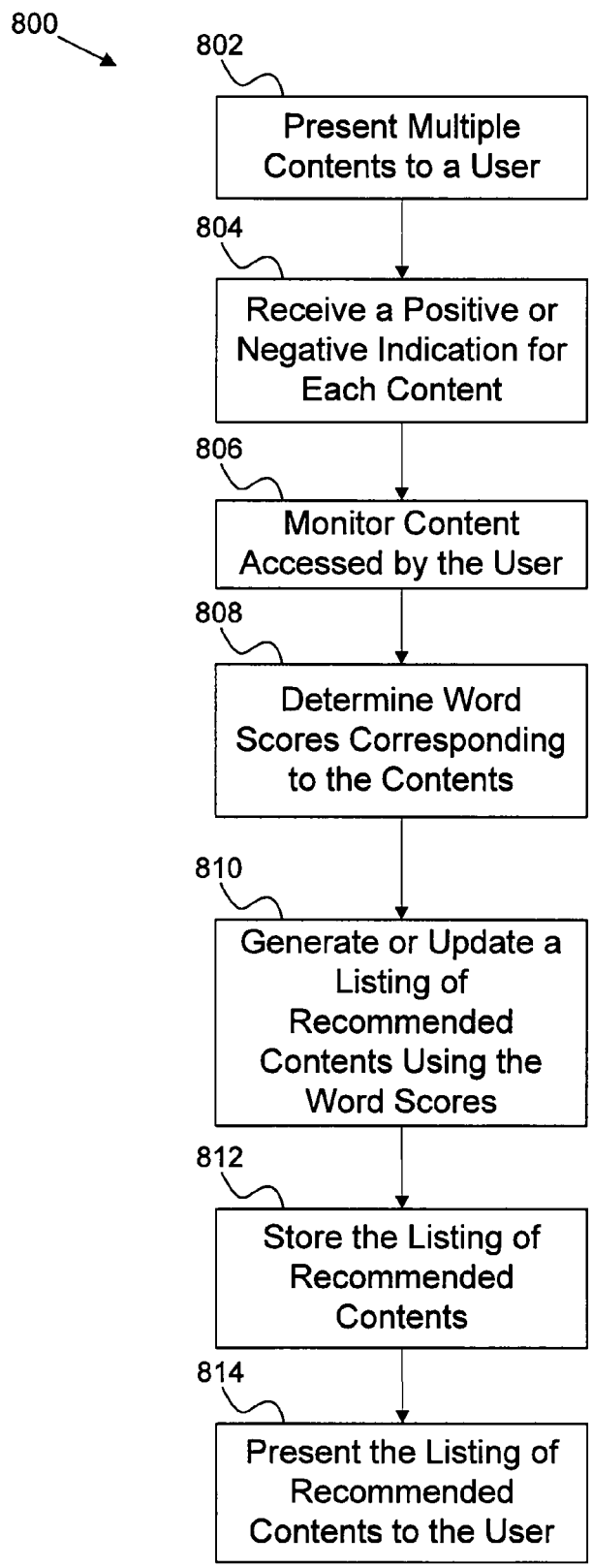
FIG. 8 is a flowchart that illustrates an example of a machine-controlled method of managing recommended contents for a user in accordance with embodiments of the disclosed technology.

FIG. 8 is a flowchart that illustrates an example of a machine-controlled method 800 of managing recommended contents for a user in accordance with embodiments of the disclosed technology. At 802, the system presents multiple contents to a user. For example, the system may present a listing of a number of different contents such as recent news articles corresponding to a particular event. In certain embodiments, the listing may include any or all of the contents from a multi-content compilation, any or all of the associated contents from an associated content compilation, or any or all of the secondary contents associated with a multi-content arrangement, using any of the corresponding techniques discussed above.

At 804, the user provides the system with a positive indication or a negative indication for at least one of the contents presented in the listing. For example, the user may use a user interface to select a "thumbs up" button to indicate a positive value or a "thumbs down" button to indicate a negative value. This may provide the system with an indication as to whether each content is important to the user. The system may also use an indirect method of learning that follows what a user accesses and may read. For example, the system may monitor certain contents that the user accesses, as shown at 806. If a user accesses a particular content, the system may interpret that as exhibiting an interest or like by the user toward the content.

FIG. 9 is a block diagram representing a sample screenshot 900 of a user interface portion of a content recommendation module in accordance with embodiments of the disclosed technology. In the example, the screenshot 900 includes a listing of three separate contents 902a-c. Each content has associated therewith "thumbs up" indicators 904a-c and "thumbs down" indicators 906a-c, respectively. A user may select one of the "thumbs up" indicators 904a-c to provide the system with an indication of a positive value for the corresponding content. With respect to contents that the user may not like, the user may select the corresponding one of the "thumbs down" indicators 906a-c to provide the system with an indication of a negative value for the content.

In the example, the screenshot 900 also includes "remove" buttons 908a-c and "expand" buttons 910a-c with the displayed contents 902a-c, respectively. A user may select one of the "remove" buttons 908a-c to direct the system to remove the content completely from further processing. Alternatively, the user may select one of the "expand" buttons 910a-c to direct the system to provide further information concerning the corresponding one of the displayed contents 902a-c.

The screenshot 900 also includes information pertaining to the displayed contents 902a-c that can be used to sort the displayed contents 902a-c. For example, each of the contents 902a-c has a computed score 912a-c, respectively. This content score may be determined in accordance with the techniques described herein, such as at 808 of FIG. 8, as discussed below. A listing of one or more categories 914a-c may also be listed with the respective contents 902a-c. The user may sort or group together some or all of the displayed contents 902a-c by one or more associated categories.

In the example, the second displayed content 902b has a higher content score 912b than the third displayed content 902c even though the third displayed content 902c is more recent than the second displayed content 902b. While more recent contents may tend to have a higher relevance value than older contents, as discussed herein, it is possible for an older content to have a higher potential interest value to a user than a newer content, which is exactly the case in the present illustrated example.

Returning to FIG. 8, the system determines a word score for any of a number of words in either the contents presented to the user at 802 or monitored by the system at 806, as shown at 808. For example, the system may simply establish a count for each word and increment the count by a positive one for each positive indication and decrement the count by a negative one for each negative indication. A word having a higher word count is likely of greater interest to the user than a word having a lesser word count.

At 810, the system generates a new listing of recommended contents or updates a previously generated listing or recommended contents. For example, as the system becomes aware of new contents, e.g., events or articles, the system may score each content based on its perceived relevance to the user. The system may do this by first breaking up the content into words and then finding the corresponding individual word score, for example. They system may then sum up the word scores for the entire content to generate a content score for the content. The system may pick one or more contents having the highest cumulative word scores to be incorporated into the listing of recommended contents.

In certain embodiments, the system may apply a word boost to matching words, for example. The system may also apply a date downgrade to older contents. For example, the system may compare a date associated with the content to the current date such that older contents would be slightly downgraded with respect to each other. Application of one or both of a word boost and a date downgrade may allow the system to generate a score between 0 and 1 that ranks the corresponding content as to whether the user would like the content, where a 0 indicates that the user would likely dislike the content and a one indicates that the user would likely like the content.

In certain embodiments, the system may determine a content score by first determining an intermediate word value (IWV) for each pertinent word within the content by applying the following calculation:

$$IWV = Abs\frac{(\#RecommendWord - \#DontRecommendWord)}{(\#RecommendWord + \#DontRecommendWord)}$$

where #RecommendWord represents a count of the number of positive indications for the word and #DontRecommendWord represents a count of the number of negative indications for the word. The system may then determine an inverse content frequency (ICF) using the following:

ICF=log(totNumDocuments/#DocumentsWithThatWord)

where totNumDocuments represents the total number of contents being processed and #DocumentsWithThatWord represents the number of the contents being processed that each have the corresponding word therein. Using the IWV and the ICR, the system may then determine the following content rank values (CRecommend and CDontRecommend) for use in the subsequent calculation (ContentRank):

CRecommend=#RecommendWord*IWV*ICF

CDontRecommend=#DontRecommendWord*IWV*ICF

ContentRank=(totR−totDR)/(totR+totDR)

where totR represents a total of the CRecommend values for all of the pertinent words and totDR represents a total of the CDontRecommend values for all of the pertinent words. The system then applies the following equalization functions to the results:

If ContentRank=0, then ContentRank is set to 0.5

Otherwise, ContentRank=ContentRank/2+0.5

The system may use the resulting ContentRank score to determine whether the content should be included in the listing of recommended contents. For example, the system may include in the listing each content that has a ContentRank value above a certain threshold, e.g., 0.5.

At 812, the system stores the listing of recommended contents. The listing may be stored locally or remotely in accordance with the various storage techniques described herein. The listing of recommended contents may also be presented to a user, as shown at 814. The system may present the listing to the user by way of a personal computing device such as a desktop or laptop computer or by way of a mobile device such as a smart phone.

In certain embodiments, the system or a user may transmit or cause to be transmitted some or all of the recommended contents within a given listing of recommended contents to a destination, e.g., a website or blog, or to another user by way of any of a number of different types of communication such as email and tweeting, for example.

In certain embodiments, the listing of recommended contents may include a summary of each recommended content using any the condensed content techniques described herein. These content summaries may be in addition to or in place of some or all of the actual text of each recommended content. Alternatively or in addition, one or both of associated content compilations and multi-content arrangements may be created or updated for any or all of the recommended contents using the techniques described herein. For example, a user may indicate that he or she desires a more minimal amount of information, e.g., condensed contents, or a more extensive amount of information, e.g., associated content compilations or multi-content arrangements for certain recommended contents provided in the listing.

In certain embodiments, they system may generate and manage a user profile as part of the content recommendation system. In these embodiments, the user may add to his or her profile words that have significance to the user but have not yet shown up in any of the evaluated contents. The user may also specify words as being positive or negative by pre-pending a plus sign ("+") or a minus sign ("−"), respectively, to the word. By adding a count for these words as well as keeping track of which words were chosen, these words may be readily deleted from the user profile should the user decide to remove the words.

The user profile may include an identification of one or more categories to which each content belongs. The user may also add or edit category listings for the contents. In certain embodiments, each content may have a location, e.g., country or region, associated with it. For any given content, the system may expand the country or region designation to include important cities and people within the corresponding region to monitor events that may specify only a city or person within the country and not the country itself.

Content Cluster Management

In certain embodiments, a content cluster management system may assist a user in understanding content such as news articles or events, real-time information streams, email messages, blog postings, etc. by generating and maintaining content clusters. As used herein, a content cluster generally refers to a grouping of one or more contents based on one or more content cluster words within each content of the content cluster. For example, news articles about a certain topic area may be grouped together into a content cluster based the occurrence of words pertaining to the topic within each of the contents. In certain embodiments, a user may print or otherwise access content cluster listings. For example, a user may direct the system to print a list of all contents that are associated with a particular content cluster.

Figure 10:
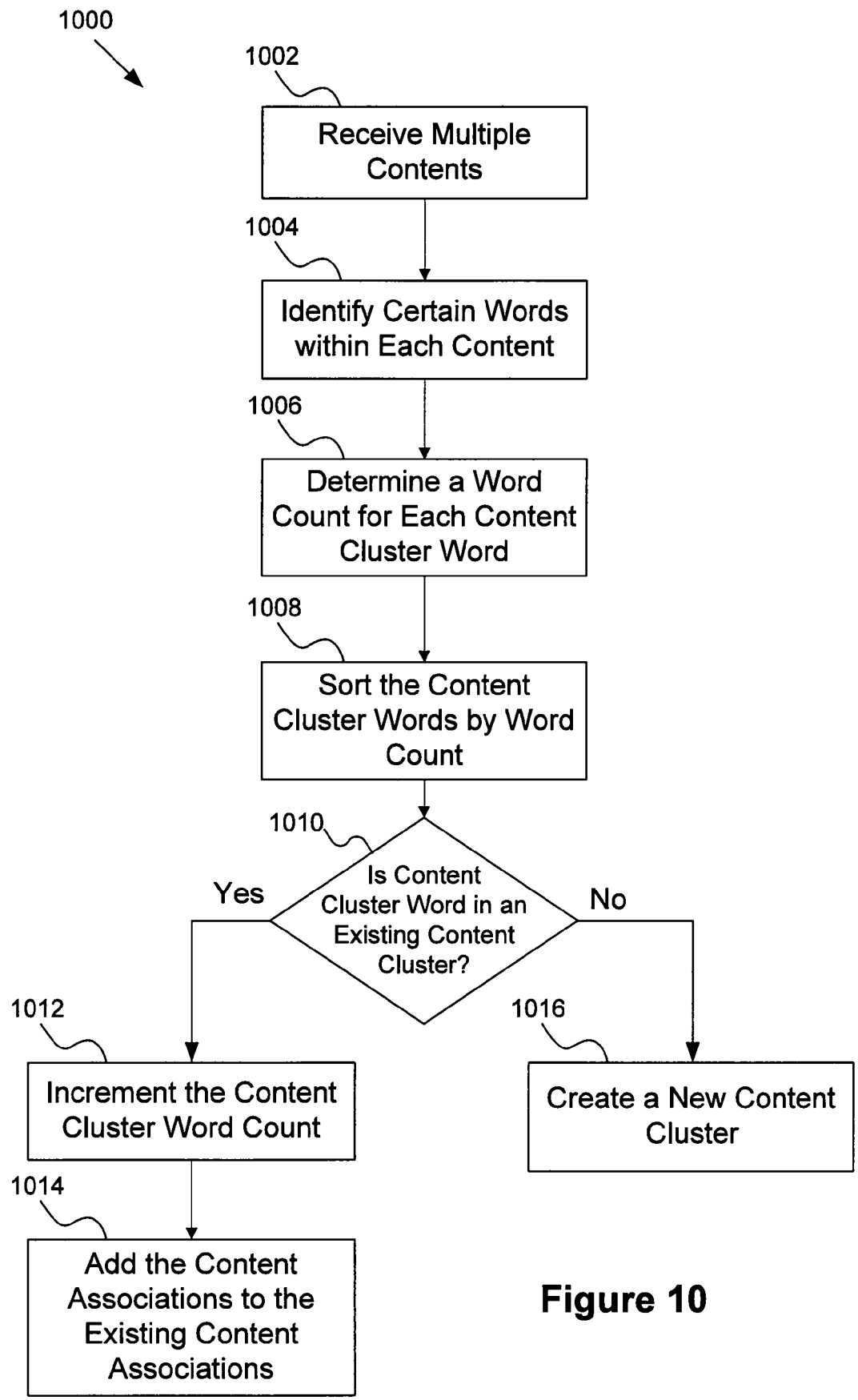
FIG. 10 is a flowchart that illustrates an example of a machine-controlled method of managing content clusters in accordance with embodiments of the disclosed technology.

FIG. 10 is a flowchart that illustrates an example of a machine-controlled method 1000 of managing content clusters in accordance with embodiments of the disclosed technology. In the example, the method 1000 involves the relating of words with other words to generate or update content clusters. At 1002, the system receives a number of contents such as news articles or other documents or events, for example.

At 1004, the system identifies certain words within each of the received contents and may extract the identified words from one or more of the contents in certain embodiments. For example, the system may remove some or all of the common words or "stopwords" from each content and process the remaining words. The system may perform additional processing before proceeding to 1006, such as paring down the list of resulting content cluster words by removing words that have been previously designated as being of little or no interest to the user.

At 1006, the system establishes a word count for each distinct word or "content cluster word" that is found within at least one of the contents received at 1002. For example, a word having at least one instance in each of three of the received contents would have a word count of three, regardless of the number of actual instances within the three contents. For each of the words, the system may maintain an association between the word and each of the contents that contains at least one instance of the word.

In certain embodiments, the system may treat certain words as having a higher value than other words based on certain characteristics. Nouns, particularly nouns identifying a Named Entity (NE), may be treated as having a higher value than non-nouns, for example. Verbs may be used in a hierarchical manner. For example, when evaluating a content cluster formed around a NE, the system may separate the content cluster into sub-clusters or fully separate clusters based on corresponding verbs. Alternatively or in addition, the system may treat variants or ontologies of a word as part of the count for the word for the corresponding content. For example, the system may treat "selling" and "sold" as two instances of the same word, e.g., "sale" or "sell," within the single content.

Once all of the contents received at 1002 have been processed through 1004 and 1006, the system may sort the content cluster words in accordance with their corresponding word counts, as shown at 1008. For example, the system may place the content cluster words having the highest and second-highest counts in the first and second positions, respectively. Starting with the content cluster word having the highest word count, for example, the system may determine whether each content cluster word is associated with a previously created content cluster, as shown at 1010.

If the content cluster word is already within an existing content cluster, then the system proceeds to 1012, where the system may increment the word count for the content cluster word. In the example, the system also adds the content cluster word's associations to the corresponding contents to the previously identified associations to other contents for the content cluster word, as shown at 1014. At this point, the system may remove the content cluster word from the listing and continue processing the remaining content cluster words until all of the identified content cluster words have all been processed.

If the system is unable to identify an existing content cluster containing the content cluster word, the system then creates a new content cluster, as shown at 1016. For example, the system may create the new content cluster using the content cluster word by itself or in connection with the next content cluster word in the listing, e.g., the word having the next-highest word count. The system may use the content cluster word or words as an identifier or label for the newly-created content cluster. In certain embodiments, the system may use more than two content cluster words for creating a content cluster.

Figure 11:
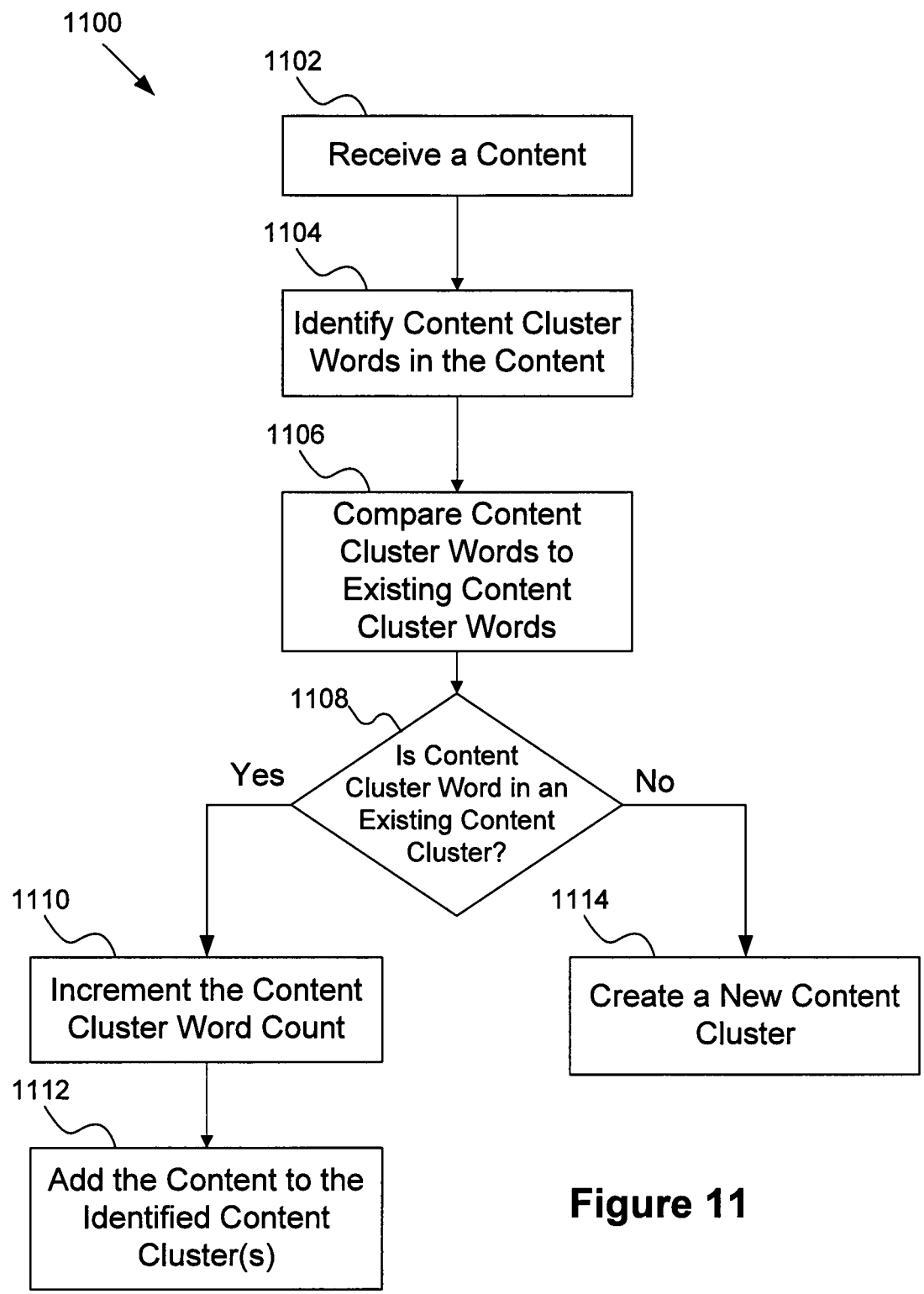
FIG. 11 is a flowchart that illustrates an example of a machine-controlled method of classifying a content into a content cluster in accordance with embodiments of the disclosed technology.

FIG. 11 is a flowchart that illustrates an example of a machine-controlled method 1100 of classifying a content into a content cluster in accordance with embodiments of the disclosed technology.

At 1102, the system receives a content. In certain embodiments, the received content has not yet been classified into a content cluster. Alternatively, the content may have been previously classified but is being sent to the system for re-classification. For example, a user may direct the system to verify that an older content's classification has not changed or, if it has, to re-classify the content. If there have been extensive changes to the content clusters, for example, the system may edit or delete existing content cluster associations or add new content cluster associations for the content.

At 1104, the system identifies and may extract content cluster words from the received content using any of the techniques described herein. Once a listing of the content cluster words has been generated, the system may compare each of the identified content cluster words to some or all of the previously identified content cluster words that each have an association to one or more existing content clusters, as shown at 1106. In the example, the system then determines whether the content cluster word is in an existing content cluster, as shown at 1108.

If the content cluster word is within an existing content cluster, the system may proceed to 1110. Otherwise the system may proceed to 1114. At 1110, the system increments the word count for the content cluster word by one. In certain embodiments, the system increments the word count by one regardless of the number of actual instances of the content cluster word or variants within the content. At 1112, the system adds the content to the content cluster or clusters that have an association with the content cluster word.

At 1114, the system may create a new content cluster based on a determination that the content cluster word does not match any existing content cluster words. In certain embodiments, this determination may also include a determination that none of the variants or synonyms of the word match any existing content cluster word. The system may use the content cluster word as an identifier or label for the new content cluster and add to the content cluster an association to the content, classifying the content within the content cluster.

The system may perform the processing at 1106 through 1114 for each content cluster word identified within the content received at 1102. The system may also perform the processing at 1102 through 1114 for each of a number of different contents received by the system.

The system may store the content clusters, including mappings of content cluster words to the content clusters, using any of the storage techniques described herein. For example, the content cluster information may be stored locally on a user's device or by a remote storage device. In certain embodiments, the system may store copies of each content in a content cluster with the corresponding content cluster information.

In certain embodiments, the system may generate a summary of some or all of the contents within a content cluster using any the condensed content techniques described herein. The system may present any or all of these content summaries to a user and may also provide the user with some or all of the actual text of each pertinent content. Alternatively or in addition, one or both of associated content compilations and multi-content arrangements may be created or updated for any or all of the content cluster contents using the techniques described herein. In certain embodiments, the system may provide a listing of some or all of the contents within a content cluster as inputs for a content recommendation module as described herein.

In certain embodiments, the system or a user may transmit or cause to be transmitted some or all of the contents within a certain content cluster to a destination, e.g., a website or blog, or to another user by way of any of a number of different types of communication such as email and tweeting, for example.

Semantic Extraction Techniques

Semantic extraction (SE) techniques may be used in connection with any of the tools and techniques described above. For example, a system may implement a SE module to enhance the finding of certain items within a content such as an article or an event. These items may include, but are not limited to, Named Entities (NEs) such as people, organizations, and companies, geographic locations, job titles, quotations, questions, acronyms, and actions. The system may then use a SE module to group these separate items semantically such that a person has an address, a phone number, a job title, a quotation, or a question, as well as actions with other people, places, or things.

In certain embodiments, the system can implement a SE module to identify certain people, places, or things within a content. For example, the system can locate capitalized words in the text and check for acronyms. If there are multiple capitalized words in a sequence, the system may send them all to a HumanNameRecognizer module that compares each word to a list of human names. If the system identifies a word as a name, the SE module may store that information and its position in the text. Otherwise, the system may check the word against a list of organizations and organization types. If a person is found, the SE module may look for a job title nearby. For example, the SE module may scan before and after the name in the text for known job titles, both stored and learned, 'ist'-type job titles, e.g., a physicist, and a location of where the person may work, such as 'at the University of Maryland.' In certain embodiments, the SE module may include an Arabic name generator for misspellings that typically occur during translation to English.

A SE module may be used to find organizations and locations. For example, a user may 'train' a SE module to find specific organizations within the text of a content. These are generally text comparisons but may be associated with a 'type' that allows for the merging of information. The type may also allow temporary or permanent removal of certain types from being found. For example, the user can 'train' the SE module to identify certain items such as latitude and longitude listings. The SE module can also be 'trained' to identify license plates, in which case the module may be directed to extract the 'form' of the license plate, not the value, and then find other words of like form.

In certain embodiments, a SE module may be used to find quotations associated with a certain person. For example, a SE module may find a quotation by looking for a quotation mark in the text and then finding the corresponding quotation mark to signify the end of the quotation. The SE module may then determine who the quotation is attributed to. If a pronoun is used, for example, the SE module may search backwards in the content for the closest name. If a job title or other identifying information is listed in connection with the quotation, the SE module may also use this information to identify the person.

A SE module may be used to find questions within a content. For example, a SE module may include a question finder to look for a question mark at the end of a sentence, extract the sentence, and then attempt to categorize the sentence into a type of question by looking for question keywords The question keywords may include, but are not limited to, the following list: {"Who", "When", "How", "Where", "Why", "What", "Can", "Could", "Do", "Does", "Did", "Has", "Have", "Will", "Would", "Please"}.

In certain embodiments, a SE module may be used to find certain actions within a content. For example, a SE module may search for specific words including but not limited to, the following list: {"called", "met", "talked", "saw", "meeting", "phoned", "was in"}. Once the SE module has identified one or more of these words, the module can find people located nearby and use them as the subject and object of the action. The system may then associate these actions with the identified person(s).

Alternatively or in addition, a SE module may be used to find acronyms for certain words. For example, a SE module may find non-numeric words having all capitalized letters by doing a comparison of the word with word.toUpperCase( ). Once the SE module has found this, the module may look for a descriptor or definition of an acronym which may go along with the word and is usually surrounded by parenthesis, e.g., ET (Eastern Time) or Mountain Time (MT). The system may store these learned definitions in memory and on disk for future use by a user.

General Description of a Suitable Machine in which Embodiments of the Disclosed Technology can be Implemented The following discussion is intended to provide a brief, general description of a suitable machine in which embodiments of the disclosed technology can be implemented. As used herein, the term "machine" is intended to broadly encompass a single machine or a system of communicatively coupled machines or devices operating together. Exemplary machines can include computing devices such as personal computers, workstations, servers, portable computers, handheld devices, tablet devices, communications devices such as cellular phones and smart phones, and the like. These machines may be implemented as part of a cloud computing arrangement.

Typically, a machine includes a system bus to which processors, memory (e.g., random access memory (RAM), read-only memory (ROM), and other state-preserving medium), storage devices, a video interface, and input/output interface ports can be attached. The machine can also include embedded controllers such as programmable or non-programmable logic devices or arrays, Application Specific Integrated Circuits, embedded computers, smart cards, and the like. The machine can be controlled, at least in part, by input from conventional input devices, e.g., keyboards, touch screens, mice, and audio devices such as a microphone, as well as by directives received from another machine, interaction with a virtual reality (VR) environment, biometric feedback, or other input signal.

The machine can utilize one or more connections to one or more remote machines, such as through a network interface, modem, or other communicative coupling. Machines can be interconnected by way of a physical and/or logical network, such as an intranet, the Internet, local area networks, wide area networks, etc. One having ordinary skill in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth, optical, infrared, cable, laser, etc.

Embodiments of the disclosed technology can be described by reference to or in conjunction with associated data including functions, procedures, data structures, application programs, instructions, etc. that, when accessed by a machine, can result in the machine performing tasks or defining abstract data types or low-level hardware contexts. Associated data can be stored in, for example, volatile and/or non-volatile memory (e.g., RAM and ROM) or in other storage devices and their associated storage media, which can include hard-drives, floppy-disks, optical storage, tapes, flash memory, memory sticks, digital video disks, biological storage, and other tangible, physical storage media. Certain outputs may be in any of a number of different output types such as audio or text-to-speech, for example.

Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the invention with reference to illustrated embodiments, it will be recognized that the illustrated embodiments may be modified in arrangement and detail without departing from such principles, and may be combined in any desired manner. And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

What is claimed is:

1. A machine-controlled method, comprising:
    a computing device receiving a first content specifically selected by a user;
    the computing device separating the first content into a plurality of sub-portions by word, text string, or a combination thereof;
    the computing device determining location information corresponding to a geographic location of the computing device;
    the computing device searching for and retrieving at least a second content based on each of at least one of the plurality of sub-portions;
    the computing device searching for and retrieving at least a third content based on the location information;
    the computing device organizing the first content, the at least a second content, and the at least a third content into a multi-content compilation including a summary of each of the first content, the at least a second content, and the at least a third content rather than the first content itself, the at least a second content itself, and the at least a third content itself; and
    the computing device storing the multi-content compilation.

2. The machine-controlled method of claim 1, wherein the first content comprises a news article.

3. The machine-controlled method of claim 1, wherein each of the plurality of sub-portions comprises a sentence.

4. The machine-controlled method of claim 1, further comprising comparing the location information to previously determined location information.

5. The machine-controlled method of claim 4, wherein searching for and retrieving the at least a third content comprises accessing at least one previously searched-for and retrieved location-based content responsive to a determination that the location information is substantially similar to the previously determined location information.

6. The machine-controlled method of claim 1, wherein each of the plurality of sub-portions comprises at least one word located within a particular portion of the first content.

7. The machine-controlled method of claim 6, wherein the at least one word is a verb.

8. The machine-controlled method of claim 6, wherein the particular portion of the first content comprises one of a title of the first content and a first sentence of the first content.

9. The machine-controlled method of claim 1, wherein searching for and retrieving the at least a second content comprises identifying at least one sub-portion of the at least a second content that is at least substantially similar to at least one of the plurality of sub-portions of the first content.

10. The machine-controlled method of claim 1, wherein the geographic location further comprises a geographic location of at least one of the user, a device storing the first content, and a device storing the at least a second content.

11. The machine-controlled method of claim 1, wherein the organizing comprises placing the at least a third content into a background portion of the multi-content compilation.

12. The machine-controlled method of claim 1, further comprising presenting the multi-content compilation to the user.

13. The machine-controlled method of claim 12, wherein the presenting comprises displaying the multi-content compilation on a display coupled with the computing device.

14. The machine-controlled method of claim 13, further comprising another computing device retrieving the condensed content, wherein the presenting comprises displaying the multi-content compilation on a display coupled with the other computing device.

15. The machine-controlled method of claim 1, wherein the storing comprises storing the multi-content compilation at a remote storage device.

16. The machine-controlled method of claim 1, wherein the computing device comprises a mobile device.

17. The machine-controlled method of claim 16, wherein the mobile device comprises one of a personal digital assistant (PDA) and a mobile communications device.

18. One or more tangible machine-readable media storing instructions that, when executed by a machine, cause the machine to perform the machine-controlled method of claim 1.

19. A machine-controlled method, comprising:
    a computing device receiving an indication of a particular content specifically selected by a user;
    the computing device determining identification information corresponding to the particular content;
    the computing device establishing an update time limit including a default timeframe;
    within the update time limit, the computing device continuously monitoring multiple content-providing sources for other contents having identification information that is at least substantially similar to the identification information corresponding to the particular content;
    the computing device comparing each of the other contents to the particular content and, based on the comparing, selecting at least some of the other contents;
    the computing device organizing the selected contents into a multi-content arrangement, the multi-content arrangement comprising the particular content;
    the computing device presenting the multi-content arrangement to the user; and
    the computing device transmitting the multi-content arrangement to a destination.

20. The machine-controlled method of claim 19, wherein the particular content comprises one of an article, a topic, a geographic location, an identification of a person, and an identification of an event.

21. The machine-controlled method of claim 19, wherein receiving the indication of the particular content comprises the user providing the indication of the particular content.

22. The machine-controlled method of claim 21, wherein the providing comprises the user selecting the particular content by way of a user interface.

23. The machine-controlled method of claim 19, wherein determining the identification information comprises extracting the identification information from the particular content.

24. The machine-controlled method of claim 19, wherein the identification information comprises at least one of an event name, a person's name, a group name, a geographic location, and a relationship between two or more entities.

25. The machine-controlled method of claim 24, wherein the comparing comprises determining whether a change in the relationship has occurred.

26. The machine-controlled method of claim 25, wherein the selecting is based at least in part on a determination that a change in the relationship has occurred.

27. The machine-controlled method of claim 19, further comprising identifying an update time interval, wherein at least one of the comparing and the selecting is performed in accordance with the update time interval.

28. The machine-controlled method of claim 19, wherein the other sources comprise multiple websites.

29. The machine-controlled method of claim 19, further comprising updating the particular content responsive to an identification of a change to the particular content.

30. The machine-controlled method of claim 29, further comprising the user providing the identification of the change to the particular content.

31. The machine-controlled method of claim 19, wherein the selecting comprises the computing device determining whether a result of the comparing for each of the other contents exceeds a predetermined threshold.

32. The machine-controlled method of claim 19, further comprising the computing device comparing at least some of the other contents to each other of the other contents and disregarding each of the other contents that is at least substantially similar to at least one other of the other contents.

33. The machine-controlled method of claim 19, further comprising the computing device issuing a notification responsive to at least one of the selecting and the organizing.

34. The machine-controlled method of claim 19, further comprising storing the multi-content arrangement.

35. The machine-controlled method of claim 34, wherein the storing comprises storing the multi-content arrangement at a remote storage device.

36. The machine-controlled method of claim 19, wherein the computing device comprises a mobile communications device.

37. The machine-controlled method of claim 19, wherein the presenting comprises displaying the multi-content arrangement on a display of the computing device.

38. The machine-controlled method of claim 19, wherein the presenting is responsive to receiving a request from the user to view the multi-content arrangement.

39. One or more tangible machine-readable media storing instructions that, when executed by a machine, cause the machine to perform the machine-controlled method of claim 19.

40. The machine-controlled method of claim 19, wherein the destination includes a website, a blog, or both a website and a blog.

41. The machine-controlled method of claim 19, wherein transmitting the multi-content arrangement includes sending an email, a tweet, or both an email and a tweet.

* * * * *